(12) United States Patent
Ghioni et al.

(10) Patent No.: US 8,903,240 B2
(45) Date of Patent: Dec. 2, 2014

(54) SCALABLE RECONFIGURABLE OPTICAL ADD-DROP MULTIPLEXER

(75) Inventors: Lorenzo Ghioni, Casalmaiocco (IT); Enrico Self, Lombardy (IT); Stefano Piciaccia, Milan (IT); Maurizio Gazzola, Milan (IT); Ronald Johnson, San Ramon, CA (US); Luca Della Chiesa, Concorezzo (IT)

(73) Assignee: Cisco Technology, Inc., San Jose, CA (US)

( * ) Notice: Subject to any disclaimer, the term of this patent is extended or adjusted under 35 U.S.C. 154(b) by 374 days.

(21) Appl. No.: 13/363,671

(22) Filed: Feb. 1, 2012

(65) Prior Publication Data

US 2013/0195462 A1 Aug. 1, 2013

(51) Int. Cl.
*H04J 14/02* (2006.01)
*H04Q 11/00* (2006.01)

(52) U.S. Cl.
USPC .............................................. 398/82; 398/48

(58) Field of Classification Search
CPC ............ G02B 6/29395; H04J 14/0206; H04J 14/0212; H03Q 2011/0016
USPC ..................................................... 398/48, 82
See application file for complete search history.

(56) References Cited

U.S. PATENT DOCUMENTS

| 7,983,558 B1 | 7/2011 | Gerstel et al. |
| 2004/0131308 A1* | 7/2004 | Mao et al. ........................ 385/24 |
| 2011/0076016 A1* | 3/2011 | Wisseman ....................... 398/48 |
| 2012/0087657 A1* | 4/2012 | Jander et al. .................... 398/48 |
| 2013/0223794 A1* | 8/2013 | Boduch ............................ 385/24 |

OTHER PUBLICATIONS

Shankar et al., "Multi-degree ROADM based on wavelength selective switches: Architectures and scalability", Optics Communications 279 (2007), pp. 94-100.
Cisco Systems, "Reconfigurable Optical Add/Drop Multiplexing Portfolio for the Cisco ONS 15454 Multiservice Transport Platform", Cisco Systems, Inc., (1992-2005) pp. 1-9.
Gringeri et al., "Flexible Architectures for Optical Transport Nodes and Networks", IEEE Communication Magazine, Jul. 2010, pp. 40-50.

* cited by examiner

*Primary Examiner* — Nathan Curs
(74) *Attorney, Agent, or Firm* — Edell, Shapiro & Finnan, LLC

(57) ABSTRACT

An apparatus includes a first optical switching complex, a second optical switching complex in optical communication with the first optical switching complex, and an optical add/drop module in optical communication with the first optical switching complex and the second optical switching complex. At least one of the optical switching complexes includes a wavelength selective switch that is configured to be arranged in a cascaded configuration that, when so configured, results in an increase in a number of available transmit and receive ports available per degree of the apparatus.

17 Claims, 5 Drawing Sheets

SCALABLE RECONFIGURABLE OPTICAL ADD-DROP MULTIPLEXER

TECHNICAL FIELD

The present disclosure relates to optical networking.

BACKGROUND

An optical add-drop multiplexer (OADM) node comprises a collection of optical and control devices used in wavelength-division multiplexing systems for multiplexing and routing different channels of light into or out of, e.g., a single mode fiber (SMF). The terms "add" and "drop" in the context of an OADM node refer to the capability of the OADM node to add one or more new wavelengths, channels or colors to an existing multi-wavelength wavelength division multiplexed (WDM) or dense WDM (DWDM) signal, and/or to drop (remove) one or more channels, and thereby pass those signals to another network path. Thus, an OADM node may be considered to be a specific type of optical cross-connect.

A reconfigurable OADM (ROADM) node is a form of OADM node that adds the ability to remotely, via software control, switch traffic in a DWDM system (whereas OADM nodes are considered to have fixed add/drop capabilities with respect to, e.g., colors or direction). While there are several different technologies used to implement a ROADM node, such as microelectonic minors and planar lightwave circuits that may be employed to selectively route wavelengths from one port to another, a ROADM node provides certain basic functionality. Namely, a ROADM node enables flexible network transport by allowing add/drop of any channel. That is, a ROADM node allows for very flexible, remote selection and routing of wavelengths transiting a given node on a fiber network. A ROADM node may allow access to any of the wavelengths going through the node for use of the data on the chosen wavelength and the possibility of adding to, or modifying, the data on that wavelength for transmitting it on to the next node(s). A ROADM node also allows the interconnection of multiple intersecting networks (multiple degree nodes) at the optical level, avoiding the expense and complexity of optical-electrical-optical conversions to achieve the interconnection. Thus, as the demand in a given network changes, additional channels can be dropped or added, remotely via software control, creating a flexible provisioning system.

DESCRIPTION OF EXAMPLE EMBODIMENTS

Overview

In one embodiment an apparatus that is configured to face a degree of a reconfigurable optical add drop multiplexer node includes a common optical receive port in communication with a first optical splitter, a plurality of optical output ports in communication with a second optical splitter disposed, in an optical path, after the first optical splitter, respective optical output ports of the plurality of optical output ports being configured to output at least one optical channel of a plurality of optical channels received in an optical signal via the common optical receive port, an auxiliary optical transmit port coupled to the common optical receive port via the first optical splitter, a common optical transmit port in communication with a first optical coupler, a plurality of optical input ports respectively configured to receive at least one optical channel of the plurality of optical channels to be output via the common optical transmit port via a second optical coupler disposed, in an optical path, prior to the first optical coupler, and an auxiliary optical receive port coupled to the common optical transmit port and configured to supply at least one optical channel of the plurality of optical channels for transmission via the first optical coupler. Multiple such apparatuses can be cascaded together using the respective auxiliary optical transmit ports and auxiliary optical receive ports such that the number of available input and output ports can be increased.

Example Embodiments

Figure 1:
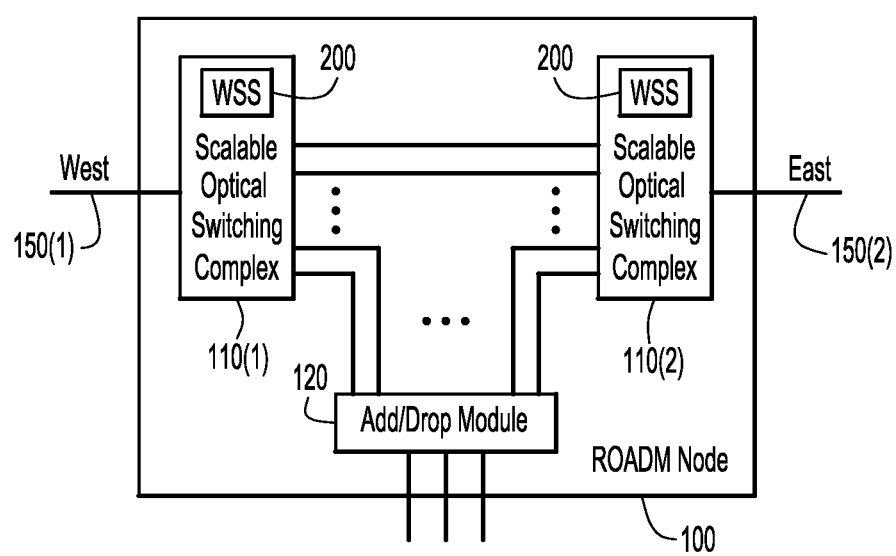
FIG. 1 depicts a ROADM node including a scalable optical switching complex that includes a wavelength selectable switch (WSS).

FIG. 1 depicts a ROADM node 100 including scalable switching complexes 110(1) and 110(2). In one embodiment, at least one of the scalable optical switching complexes 110 includes a wavelength selectable switch (WSS) 200. More specifically, in one embodiment ROADM node 100 includes a scalable optical switching complex 110(1) that faces a "west" direction and a scalable optical switching complex 110(2) that faces an "east" direction. In this configuration, ROADM node 100 is a ROADM node having two degrees, where each degree represents a direction to which the node may connect. In addition to the scalable optical switching complexes 110, an add/drop module 120 is provided. Add/drop module 120 is configured to add or drop particular wavelengths, channels or colors to or from a given multiplexed optical signal.

More specifically, in a ROADM node 100, like that depicted in FIG. 1, a single mode fiber (SMF) optical fiber 150(1) may be connected to the node's west facing direction. This SMF optical fiber 150(1) may carry a wave division multiplexed (WDM) or dense (DWDM) optical signal comprising a plurality of wavelengths, channels or colors. SMF optical fiber 150(1) may carry channels towards the ROADM node 100, and likewise may carry wavelengths, channels or colors (hereinafter, collectively, "channels") away from ROADM node 100.

One or more of the multiple channels being carried by SMF optical fiber 150(1) may be dropped at ROADM node 100 via add/drop module 120. Likewise, one or more channels can be added to the SMF optical fiber 150(1) for transmission to another optical node, as long as that channel is not already in use.

A similar SMF optical fiber 150(2) may be in communication with scalable optical switching complex 110(2). This fiber carries channels to and from the east direction. These channels may also be added or dropped by the add/drop module 120.

In one embodiment, at least one of the scalable optical switching complexes 110 includes a wavelength selectable switch (WSS) 200, the features and function of which are described more fully below. At a high level, multiple combined WSSs 200 provide an increased number of transmit and receive ports that permits the ROADM node 100 to be more easily scaled to accommodate more selective control over individual channels traversing the ROADM node 100. WSS 200 is described next with reference to FIG. 2.

WSS 200 comprises a common optical receive port 210(1) that is configured to be coupled to or in communication with, e.g., SMF optical fiber 150(1). The common optical receive port 210(1) is also in communication with optical coupler/splitter 220(1), which in turn is in communication with optical splitter 230. Optical splitter 230 is connected to, in this embodiment, four optical amplifiers 250(1)-250(4). Those skilled in the art will appreciate that fewer or more optical amplifiers 250 may be provided, depending on the output characteristics of optical splitter 230 as well as design considerations and implementation details. The outputs of optical amplifiers 250(1)-250(4) are in communication with splitters 280(1)-280(4). These optical splitters 280(1)-280(4) are connected to wavelength selective filters 285(1)-285(16). The outputs of the wavelength selective filters 285(1)-285(16) are designated in FIG. 2 as express transmit (EXP-TX) ports 1-16. The number of optical splitters and express transmit ports may also be modified.

Figure 2:
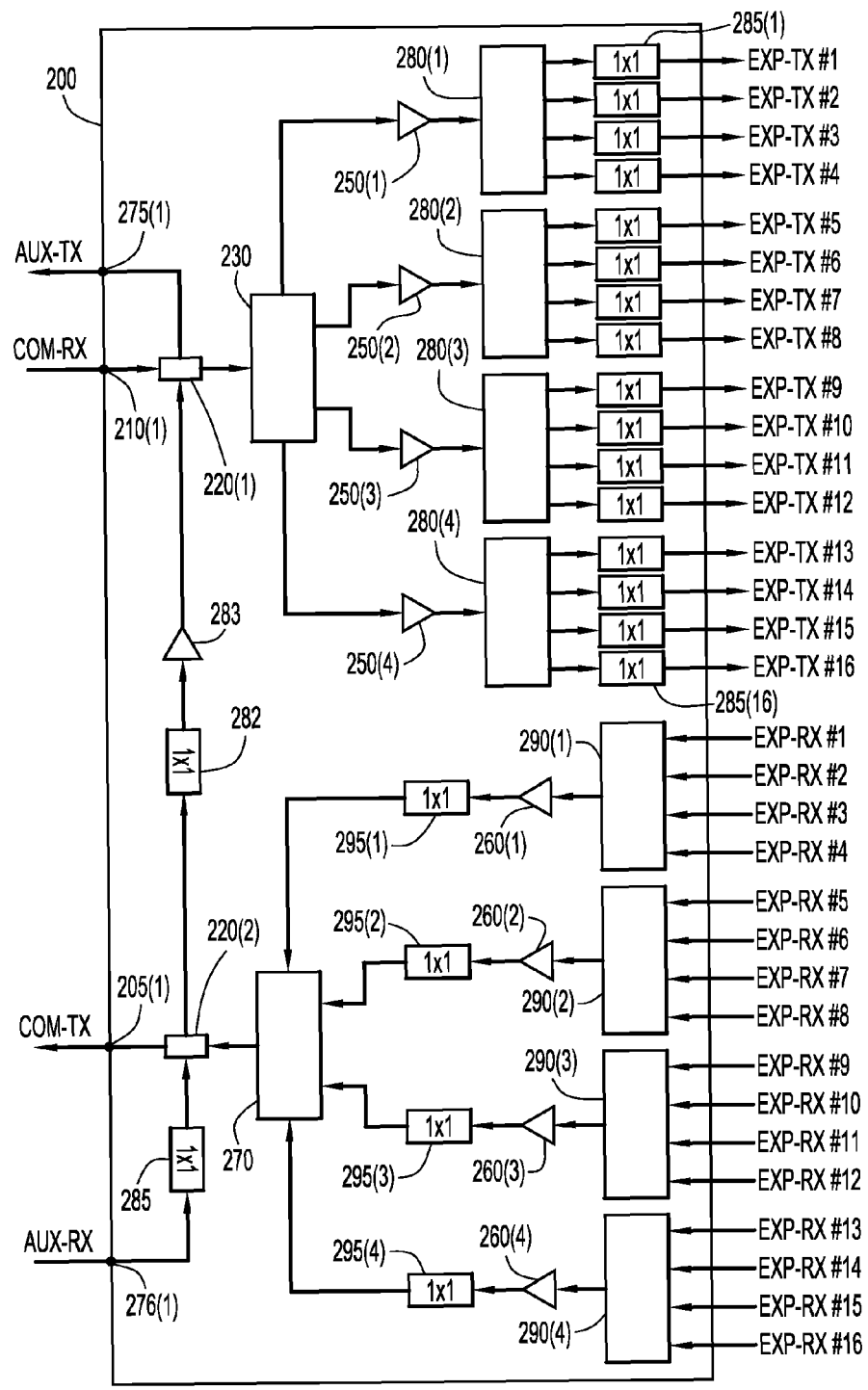
FIG. 2 depicts a schematic block diagram of the WSS shown in FIG. 1 including an auxiliary optical transmit port, auxiliary optical receive port, and an optical loopback arrangement.

WSS 200 also includes a plurality of optical couplers 290(1)-290(4) that have inputs designated in FIG. 2 as express receive (EXP-RX) ports 1-16. The outputs of couplers 290(1)-290(4) are in communication with optical amplifiers 260(1)-260(4), which are in turn connected to wavelength selective filters 295(1)-295(4). Outputs of the wavelength selective filters 295(1)-295(4) are in communication with optical coupler 270. An output of optical coupler 270 is connected to optical coupler/splitter 220(2). An output of optical coupler/splitter 220(2) is designated as common optical transmit port 205(1).

In addition, WSS 200 includes two more ports: an auxiliary transmit port 275(1) and an auxiliary receive port 276(1). The auxiliary transmit port 275(1) is in communication with optical coupler/splitter 220(1) and auxiliary receive port 276(1) is in communication with optical coupler/splitter 220(2) via, e.g., a wavelength selective filter 285.

WSS 200 still further comprises, in one possible embodiment, an optical loopback arrangement comprising wavelength selective filter 282 and optical amplifier 283.

As noted previously, an SMF optical fiber, such as 150(1), carries multiple optical channels in a DWDM format. In certain implementations, the number of individual channels might be on the order of 96. More or fewer channels are, of course, possible. Assuming such a SMF optical fiber were connected to common optical receive port 210(1), the DWDM signal would be first passed to optical coupler/splitter 220(1). The DWDM optical signal would then pass to optical splitter 230. In this particular implementation, optical splitter 230 splits the DWDM optical signal into four replicas and each replicated DWDM optical signal is passed to a respective optical amplifier 250(1)-250(4). The resulting amplified optical signals are then passed to respective optical splitters 280(1)-280(4). The outputs of optical splitters 280(1)-280(4) are full replicas of the received optical signals at the common optical receive port 210(1). The outputs of splitters 280 are then passed to wavelength selective filters 285

(1)-286(16), whose outputs correspond to the express transmit ports 1-16. It is noted that splitters 230 and 280 are configured to split an optical signal 4 ways. However, this is only an example and more or fewer splits are possible.

In one implementation, wavelength selective filters 285(1)-285(16) are configurable to select any one of the, e.g., 96 individual optical signals being carried by the DWDM optical signal for output as an express transmit channel via one of the express transmit ports 1-16. In one possible implementation, wavelength selective filters 285 can be configured to select an initial bandwidth on the order of 50 GHz with increments of 25 GHz such that, e.g., bandwidths of 75 GHz, 100 GHz, 125 GHz can be selected. Each of the wavelength selective filters 285 may also be configured to pass combinations of channels that are carried by the DWDM optical signal. These combinations of channels may be contiguous or may be separated by intervening channels (i.e., wavelengths or colors). The selected channels may be made available at the express transmit ports 1-16 and may be routed directly to another scalable wavelength switching complex 110 within the ROADM node 100 or to the add/drop module 120. Optical signals available at express transmit ports 1-16 may also be routed to a patch panel (not shown) that may be disposed in such a way as to interconnect scalable optical switching complexes 110(1), 110(2) and add/drop module 120. With the appropriate architecture the same channel can be expressed to multiple different ports. This enables broadcast functionality directly in the optical domain, such that it is possible for the same signal to be dropped in multiple different locations. It should be noted that the 2-degree ROADM node 100 being discussed herein is only an example. ROADM nodes with more than 2 degrees can be deployed consistent with the functionality described herein.

Channels received at the express receive ports 1-16 are handled in a somewhat similar fashion, only in reverse. A channel (or channels) received at an express receive port may be, e.g., destined for transmission external to the ROADM node 100. As shown, in this particular implementation, 16 ports are available. In the configuration shown, an optical coupler 290(1) (of the multiple optical couplers 290(2)-290(4)) couples the channel received with channels received by three other express receive ports. Outputs of the couplers 290(1)-290(4) are passed to respective optical amplifiers 260(1)-260(4) and the outputs of the optical amplifiers 260 are passed to wavelength selective filters 295(1)-295(4). Wavelength selective filters 295(1)-295(4) are employed to restrict the incoming optical signal (channel) to predetermined channels or colors to, e.g., reduce interference. Filters 295 may be similar to filters 285 in that they may have bandwidth selectivity in increments of 25 GHz.

The outputs of the wavelength selective filters 285(1)-285(4) are passed to optical coupler 270 that couples or multiplexes the received optical signals into a DWDM optical signal that is ready to be transmitted from the WSS 200 via its common optical transmit port 205(1). Transmission may be via SMF optical fiber 150(1) (as shown in FIG. 1).

Still referring to FIG. 2, WSS 200 includes 16 express transmit ports and 16 express receive ports. However, as noted earlier, there could be on the order of 96 separate channels that can be supported by a single SMF optical fiber 150. To enable a per-degree increase in the number ports available for either transmit or receive, the auxiliary optical transmit port 275(1) and the auxiliary optical receive port 276(1) are provided.

Figure 3:
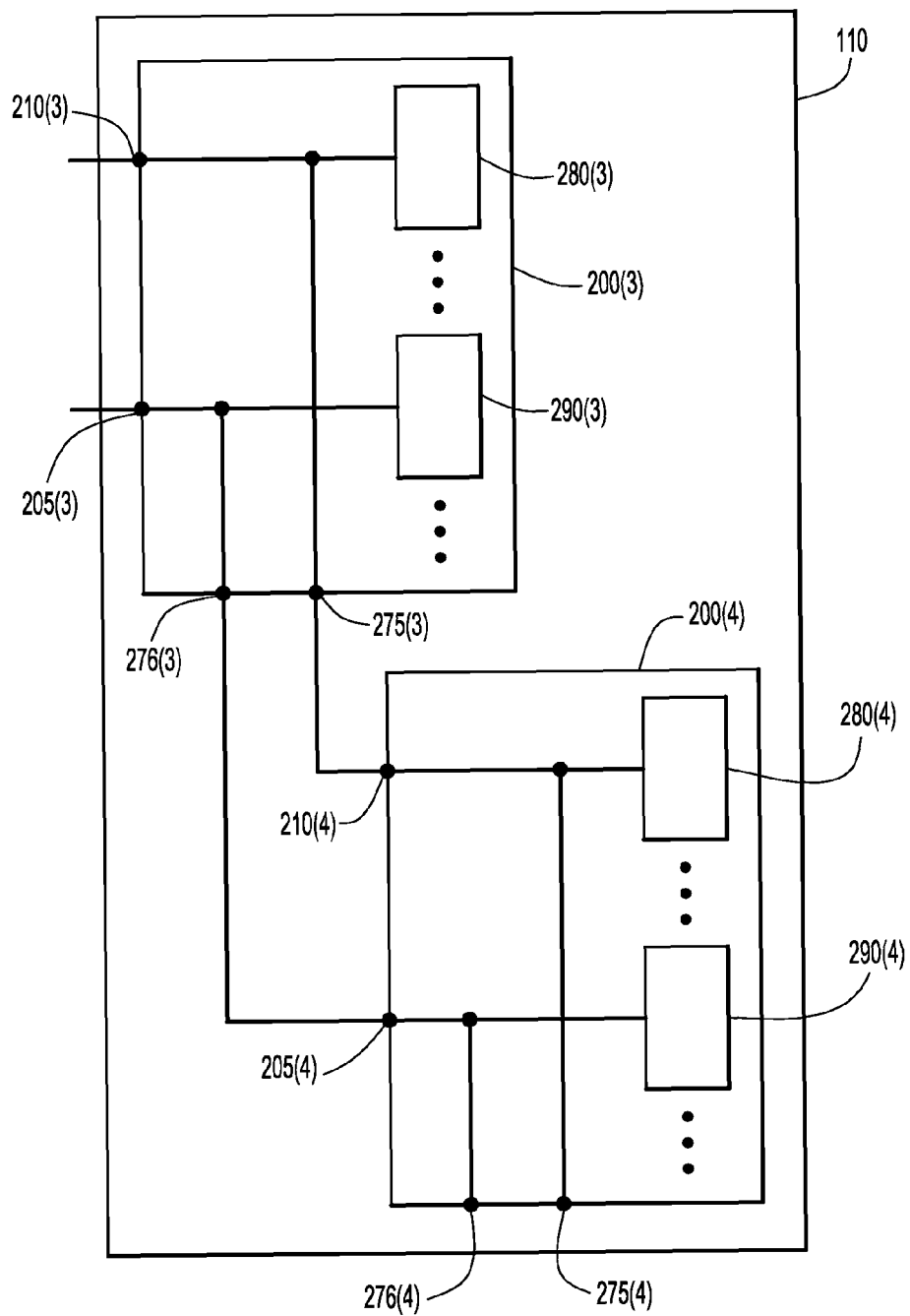
FIG. 3 depicts a schematic block diagram that illustrates per-degree scalability employing the auxiliary common transmit port and the auxiliary common receive port of the WSS.

As shown, auxiliary optical transmit port 275(1) is in communication with optical coupler/splitter 220(1) such that a replica of the entire incoming DWDM optical signal from, e.g., a SMF optical fiber, can be made available to another WSS 200 in the cascaded configuration shown in FIG. 3. Similarly, there may be a need to have more than 16 express receive ports. For example, with 96 available channels, it may be desired to add, e.g., 25 or 30 channels at a given ROADM node, which exceeds the 16 total available ports on a single WSS, as configured in the embodiment described herein. To increase the number of express receive ports the WSS 200 may be cascaded as shown in FIG. 3.

More specifically, and as shown in FIG. 3, two WSSs 200(3) and 200(4) can be deployed together as part of a scalable optical switching complex 110. The two WSSs 200 (3), 200(4) are arranged in a cascaded fashion. Auxiliary transmit port 275(3) routes a replica of an optical signal received at common optical receive port 210(3) to the common optical receive port 210(4) of WSS 200(4). In this way, the number of available express transmit ports has been doubled from 16 to 32. Thus, by employing the auxiliary transmit port 275 of one WSS 200 to feed a common optical receive port 210 of another WSS 200, it is possible to increase the number of ports available from which to obtain one more channels being carried by an incoming optical signal at the ROADM node 100. That is, in the example shown, 32 individual express transmit ports are now available as a result of the cascaded configuration enabled by the auxiliary optical transmit port 275.

This form of cascading is different from, e.g., connecting one of the express transmit ports of a WSS to the common receive port of another WSS, since the power level available at an express transmit port is diminished due to the multiple splitting operations that have already been applied to an incoming optical signal. By splitting the incoming optical signal near its source, a greater optical power is available for down line, cascaded WSSs. Stated alternatively, an advantage of this configuration is the fact that there is no filtering penalty associated with cascading units compared with the case in which a cascaded configuration is obtained through an express transmit port. That is, there is no optical filtering on the COM-RX to AUX-TX optical path while there is at least one optical filter 285 in the path between COM-RX and EXP-TX ports.

Cascading of WSSs to achieve a scalable optical switching complex also has an impact on a receive side. In the case shown in FIG. 3, common optical transmit port 205(4) of WSS 200(4) is in communication with auxiliary optical receive port 276(3). Since auxiliary optical receive port 276 (3) is in communication with coupler/splitter 220(2) (see FIG. 2), common optical transmit port 205(3) will include all of the channels delivered via the auxiliary optical receive port 276 (3) along with channels via coupler 270 (again, see FIG. 2). In this way, the number of individual channels that can be handled from another optical switching complex 110 or from add/drop module 120 can be increased.

One advantage of the architecture described herein is that no additional filtering is needed when the number of ports grows. That is, reducing the overall amount of optical filtering to which an incoming optical signal is subjected can be desirable in the context of increasing the number of ROADM nodes via which the optical signal can pass. At growing per-channel bit rates (e.g., from 40 Gbps to 100 Gbps and to 400 Gbps), optical filtering may have a growing and detrimental effect on the overall penalty introduced on the optical signal, which limits the overall distance the optical signal can travel between optical-electrical-optical regeneration points.

While only two WSSs 200 are shown being cascaded in FIG. 3, several additional WSSs may be further cascaded off of WSS 200(4). In this way, the number of individual express ports available within a ROADM node 100 can be increased by adding WSSs in the manner described. The option to increase the number of ports in the manner described provides at least two benefits. First, an increase in the number of ports can enable an increase in the number of Add/Drop ports of the ROADM node. Second, an increase in the number of ports can enable an increase in the number of degrees that can be supported by the ROADM node. In practical implementations the benefits will be a combination of these two benefits, enabling growth in the overall number of Add/Drop ports and the number of degrees supported by the ROADM node.

Reference is again made to FIG. 2 for an explanation of the loopback arrangement comprising wavelength selective filter 282 and optical amplifier 283. As shown, this serially arranged optical path is connected between coupler/splitter 220(2) and coupler splitter 220(1). In this configuration, the loopback arrangement can be employed to test a given optical path. More specifically, the loopback arrangement permits a test of an optical stream by looping the optical stream back to its source.

Figure 4:
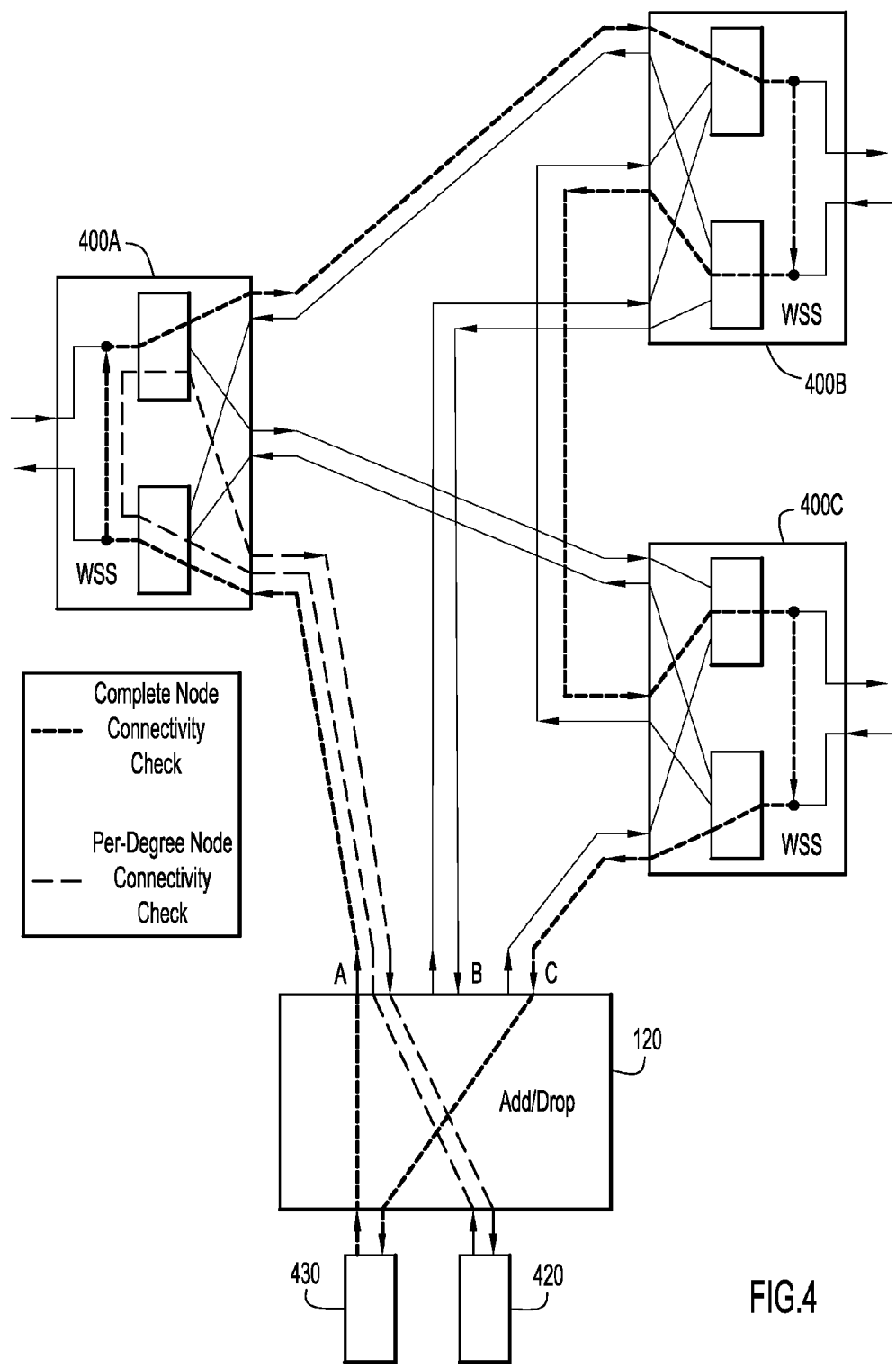
FIG. 4 shows possible applications of the optical loopback arrangement.

Assume that it is desired to know whether a given channel is properly being received via an express receive port without having to monitor an entirely different ROADM node. Using the loopback arrangement, one can select the channel using the wavelength selective filter 282 to match the channel of interest. Coupler/splitter 220(2) may route the entirety of the optical signal from coupler 270 towards the loopback arrangement. Wavelength selective filter 282 will then pass only the selected channel. That channel will then be amplified by optical amplifier 283 and be passed to coupler splitter 220(1). The channel will then be routed towards the express transmit ports. Thus, it is possible to determine using a single WSS (which may be in the form of line card) whether a given optical signal has been routed (cabled) properly external to the WSS. FIG. 4. shows how the loopback mechanism can be employed to check connectivity within a given ROADM node and among multiple RAODM nodes. In FIG. 4 each of the WSSs 400A, 400B, and 400C are in communication with each other and with the add/drop module 120. A first loopback test can be initiated from an input channel of the add/drop module 120 with, e.g., a test device 420. Assuming, for instance, that optical fiber has been properly connected, a test signal sent from test device 420 should pass through add/drop module 120, pass to an express receive port, pass through the loopback arrangement, and pass out of an express transmit port back to the add/drop module 120 such that it is received back as the test device 420. Such a loopback test tests connectivity within a given ROADM node.

To test connectivity among multiple ROADM nodes, a test signal may be initiated from, e.g., test device 430 (although a same test device could be used). That signal is then passed through add/drop module 120 and to WSS 400A. WSS 400A in turn passes the signal through its loopback arrangement to WSS 400B, which passes the signal through its loopback arrangement to WSS 400C, which all passes the signal through its loopback arrangement such that the signal returns to add/drop module 120 and is routed to test device 430. Such a test confirms that fiber optic cabling has been properly established among the several ROADM nodes and that a given signal can be routed as expected.

Loopback testing can also be used to test connections of optical cables at cascaded WSSs using the auxiliary receive port 276(1), which is also in communication with coupler/splitter 220(2). Thus, any optical signal being supplied via a cascaded WSS can also be subjected to loopback analysis.

It should be noted that a channel or set of channels that is looped back might interfere other channels that might be in service. Thus, when not being used, the loopback path can be eliminated (i.e., turned off) by configuring either the wavelength selective filter 282 or the optical amplifier 283 (or both) to function as an optical switch.

Figure 5:
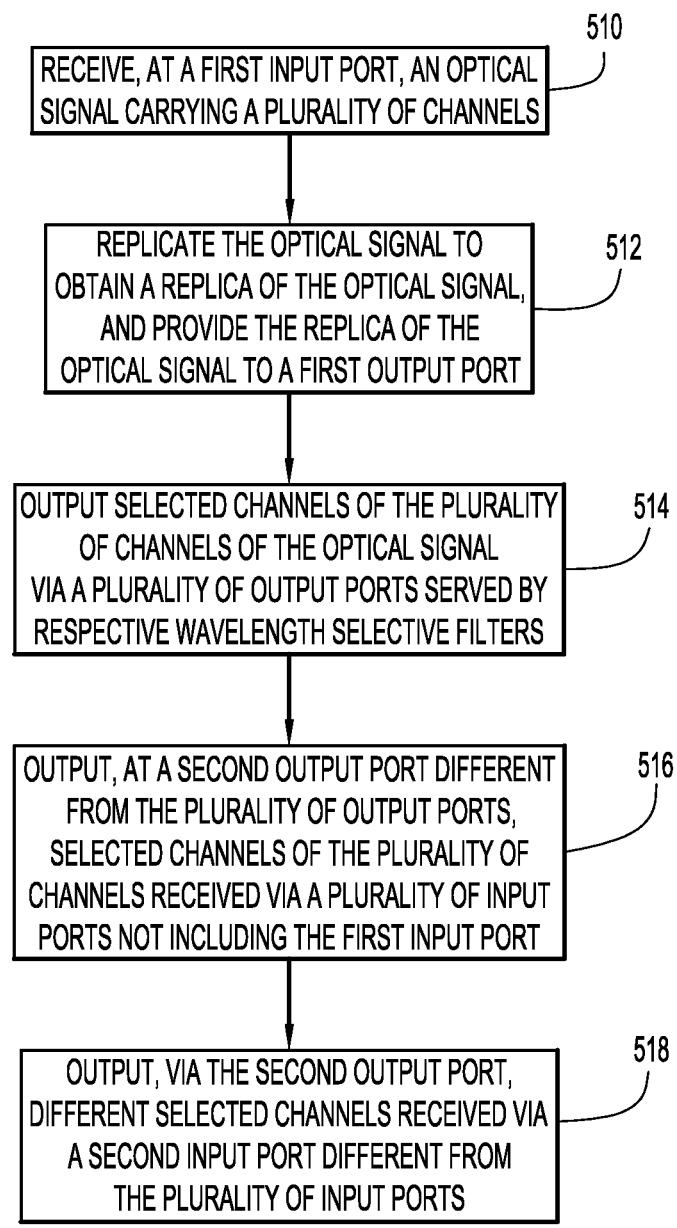
FIG. 5 is a flowchart illustrating example operations that may be performed using the scalable WSS shown in FIG. 2.

FIG. 5 is a flowchart illustrating example operations that may be performed with a WSS configured as described herein. At 510 the operations include receiving, at a first input port (e.g., common optical receive port 210(1)), an optical signal carrying a plurality of channels. At 512, operations may include replicating the optical signal to obtain a replica of the optical signal, and providing the replica of the optical signal to a first output port (e.g., auxiliary optical transmit port). At 514, the operations may include outputting selected channels of the plurality of channels of the optical signal via a plurality of output ports (e.g., express transmit ports) served by respective wavelength selective filters.

At 516, the operations may include outputting, at a second output port (e.g., common optical transmit port) different from the plurality of output ports, selected channels of the plurality of channels received via a plurality of input ports (e.g., express receive ports) not including the first input port, and at 518 the operations may include outputting, via the second output port, different selected channels received via a second input port different from the plurality of input ports. The foregoing operation may be performed within, for example, a wavelength selective switch (WSS) 200, which may be implemented as an optical line card that is itself part of an optical switching complex that is part of a ROADM node. The operations described herein enable multiple WSSs to be cascaded using the auxiliary optical transmit and auxiliary optical receive ports and, as such, enable an increase in the number of available express ports per-degree of a ROADM node.

In one possible implementation, the operations may also include, internal to the optical line card, looping back at least part of an optical signal to be output from the second output port (e.g., common optical transmit port) to the first input port (e.g., common optical receive port).

In sum, and with respect to a WSS and in accordance with an embodiment, a common optical receive port is in communication with a first optical splitter. A plurality of optical output ports are in communication with a second optical splitter disposed, in an optical path, after the first optical splitter, and each one of the plurality of optical output ports is configured to output at least one optical channel of a plurality of optical channels received in an optical signal via the common optical receive port. An auxiliary optical transmit port is coupled to the common optical receive port via the first optical splitter.

A common optical transmit port is in communication with a first optical coupler. A plurality of optical input ports are each configured to receive at least one optical channel of the plurality of optical channels to be output via the common optical transmit port via a second optical coupler disposed, in an optical path, prior to the first optical coupler. An auxiliary optical receive port is coupled to the common optical transmit port and configured to supply at least one optical channel of the plurality of optical channels for transmission via the first optical coupler.

As explained herein, the WSS may be a component of a ROADM node and can be arranged to face a degree of the ROADM node.

To connect two WSSs together and thus increase the number of available ports, the auxiliary optical receive port of a first WSS is placed in communication with a common optical transmit port of a second WSS. Similarly, the auxiliary optical transmit port of the first WSS may be placed in communication with a common optical receive port of the second WSS.

In one embodiment, the WSS supports 16 express transmit ports and 16 express receive ports, which may be in communication with another WSS of another degree or may be in communication with an optical add/drop module.

In one implementation the WSS includes a splitter configured to split the optical signal received at the common optical receive port and pass a resulting copy of the signal received at the common optical receive port to the auxiliary optical transmit port. The WSS may also include a coupler configured to couple an optical signal received at the auxiliary optical receive port with the optical signal generated from the common transmit port.

Using cascaded arrangements of multiple WSSs, the per-degree number of ports in a ROADM node can be increased in a modular fashion.

Although the system and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following.

What is claimed is:

1. An apparatus, comprising:
    a common optical receive port in communication with a first optical splitter;
    a plurality of optical output ports in communication with a second optical splitter disposed, in an optical path, after the first optical splitter, each one of the plurality of optical output ports configured to output at least one optical channel of a plurality of optical channels received in an optical signal via the common optical receive port;
    an auxiliary optical transmit port coupled to the common optical receive port via the first optical splitter;
    a common optical transmit port in communication with a first optical coupler;
    a plurality of optical input ports each configured to receive at least one optical channel of the plurality of optical channels to be output via the common optical transmit port via a second optical coupler disposed, in an optical path, prior to the first optical coupler;
    an auxiliary optical receive port coupled to the common optical transmit port and configured to supply at least one optical channel of the plurality of optical channels for transmission via the first optical coupler, and
    an optical path between the common optical transmit port and the common optical receive port via the first optical splitter and first optical coupler.

2. The apparatus of claim 1, wherein the apparatus is a component of a ROADM node and faces a degree of the ROADM node.

3. The apparatus of claim 1, wherein the apparatus is a first apparatus and the auxiliary optical receive port of the first apparatus is in communication with a common optical transmit port of a second apparatus, the second apparatus having a same configuration as the first apparatus.

4. The apparatus of claim 1, wherein the apparatus is a first apparatus and the auxiliary optical transmit port of the first apparatus is in communication with a common optical receive port of a second apparatus, the second apparatus having a same configuration as the first apparatus.

5. The apparatus of claim 1, wherein the apparatus is a first apparatus, and a second apparatus having a same configuration as the first apparatus is configured to be in communication with the first apparatus via only that auxiliary optical transmit port of the first apparatus and the auxiliary optical receive port of the first apparatus.

6. The apparatus of claim 1, wherein the plurality of optical output ports comprises 16 ports.

7. The apparatus of claim 1, wherein the plurality of optical input ports comprises 16 ports.

8. The apparatus of claim 1, wherein the first optical splitter is configured to split the optical signal received at the common optical receive port and pass a resulting copy of the signal received at the common optical receive port to the auxiliary optical transmit port.

9. The apparatus of claim 1, wherein the first optical coupler is configured to couple an optical signal received at the auxiliary optical receive port with the optical signal generated from the common transmit port.

10. The apparatus of claim 1, further comprising a wavelength selective filter disposed in the optical path between the common optical transmit port and the common optical receive port.

11. The apparatus of claim 1, further comprising an optical amplifier disposed in the optical path between the common optical transmit port and the common optical receive port.

12. An apparatus comprising:
a first optical switching complex;
a second optical switching complex in optical communication with the first optical switching complex; and
an optical add/drop module in optical communication with the first optical switching complex and the second optical switching complex,
wherein at least one of the optical switching complexes includes a wavelength selective switch that is arranged in a cascaded configuration that results in an increase in a number of available transmit and receive ports available per a degree of the apparatus relative to a number of available transmit and receive ports available per the degree of the apparatus when a first transmit port of the first optical switching complex is connected to a common receive port of the second optical switching complex, and
wherein the wavelength selective switch comprises an internal optical loopback path arranged between a common optical transmit port and a common optical receive port of the wavelength selective switch.

13. The apparatus of claim 12, wherein the apparatus is a reconfigurable optical add/drop multiplexer.

14. The apparatus of claim 12, wherein the number of transmit and receive ports available per degree of the apparatus is increased as a factor of a number of individual wavelength selective switches that are arranged in the cascaded configuration.

15. The apparatus of claim 12, wherein each wavelength selective switch includes 16 transmit ports and 16 receive ports.

16. A method comprising:
receiving, at a first input port, an optical signal carrying a plurality of channels;
replicating the optical signal to obtain a replica of the optical signal, and providing the replica of the optical signal to a first output port;
outputting selected channels of the plurality of channels of the optical signal via a plurality of output ports served by respective wavelength selective filters;
outputting, at a second output port different from the plurality of output ports, selected channels of a plurality of channels received via a plurality of input ports not including the first input port;
outputting, via the second output port, different selected channels received via a second input port different from the plurality of input ports, and
providing an optical path between the second output port and the first input port by looping back, from a first coupler that is in communication with the second output port to a first optical splitter that is in communication with the first input port, at least part of an optical signal to be output.

17. The method of claim 16, wherein the method is performed within an optical line card and the looping back is internal to the optical line card.

* * * * *